(12) United States Patent
Whitehead et al.

(10) Patent No.: US 8,168,340 B2
(45) Date of Patent: May 1, 2012

(54) WATER REMOVAL FEATURES FOR PEMFC STACK MANIFOLDS

(75) Inventors: Lee C. Whitehead, Middleport, NY (US); Steven R. Falta, Honeoye Falls, NY (US); Thomas A. Trabold, Pittsford, NY (US); Jon P. Owejan, Honeoye, NY (US); Thomas W. Tighe, Bloomfield, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1210 days.

(21) Appl. No.: 11/936,633

(22) Filed: Nov. 7, 2007

(65) Prior Publication Data

US 2009/0117432 A1  May 7, 2009

(51) Int. Cl.
 *H01M 8/06* (2006.01)
 *H01M 8/04* (2006.01)
(52) U.S. Cl. .................. 429/414; 429/457; 429/514
(58) Field of Classification Search .......... 429/413–414, 429/454–461, 512–514
 See application file for complete search history.

(56) References Cited

U.S. PATENT DOCUMENTS

| | | | |
|---|---|---|---|
| 3,985,578 A | 10/1976 | Witherspoon et al. | |
| 5,272,017 A | 12/1993 | Swathirajan et al. | |
| 5,624,769 A | 4/1997 | Li et al. | |
| 5,776,624 A | 7/1998 | Neutzler | |
| 6,103,409 A | 8/2000 | DiPierno Bosco et al. | |
| 6,277,513 B1 | 8/2001 | Swathirajan et al. | |
| 6,350,539 B1 | 2/2002 | Wood, III et al. | |
| 6,372,376 B1 | 4/2002 | Fronk et al. | |
| 6,376,111 B1 | 4/2002 | Mathias et al. | |
| 6,521,381 B1 | 2/2003 | Vyas et al. | |
| 6,524,736 B1 | 2/2003 | Sompalli et al. | |
| 6,528,191 B1 | 3/2003 | Senner | |
| 6,566,004 B1 | 5/2003 | Fly et al. | |
| 6,630,260 B2 | 10/2003 | Forte et al. | |
| 6,649,297 B1 * | 11/2003 | Marchand et al. | 429/513 |
| 6,663,994 B1 | 12/2003 | Fly et al. | |
| 6,740,433 B2 | 5/2004 | Senner | |
| 6,777,120 B2 | 8/2004 | Nelson et al. | |
| 6,793,544 B2 | 9/2004 | Brady et al. | |
| 6,794,068 B2 | 9/2004 | Rapaport et al. | |
| 6,811,918 B2 | 11/2004 | Blunk et al. | |
| 6,824,909 B2 | 11/2004 | Mathias et al. | |
| 2004/0229087 A1 | 11/2004 | Senner et al. | |
| 2005/0026012 A1 | 2/2005 | O'Hara | |
| 2005/0026018 A1 | 2/2005 | O'Hara et al. | |
| 2005/0026523 A1 | 2/2005 | O'Hara et al. | |
| 2005/0175883 A1 * | 8/2005 | Trabold et al. | 429/38 |
| 2009/0023029 A1 * | 1/2009 | Matsumoto et al. | 429/30 |

* cited by examiner

*Primary Examiner* — Patrick Ryan
*Assistant Examiner* — Muhammad Siddiquee
(74) *Attorney, Agent, or Firm* — John A. Miller; Miller IP Group, PLC

(57) ABSTRACT

A bipolar plate includes angled facets oriented to form V-shaped projections on the plate edge. Liquid leaving the reactant channels is drawn back into the V-shaped grooves of the projections, leaving no liquid to obstruct the channel exit openings. The bipolar plate includes one portion of the bipolar plate offset from another portion of the bipolar plate so as to expose the reactant channels. The liquid is drawn toward the end portions of the reactant channels by capillary forces, while the gas flows can exit near the beginning of the offset portion. A fuel cell stack includes angled facets that are rotated to lie in the plane of the bipolar plate edges. The edges are chamfered so the channel exit openings of the reactant channels are at the tip portions thereof, thus allowing the liquid to flow away from the channel exit openings and the gas to exit freely.

12 Claims, 3 Drawing Sheets

WATER REMOVAL FEATURES FOR PEMFC STACK MANIFOLDS

FIELD OF THE INVENTION

The present invention relates generally to fuel cell systems, and more particularly to water removal systems for fuel cell stacks.

BACKGROUND OF THE INVENTION

Fuel cells have been used as a power source in many applications. For example, fuel cells have been proposed for use in electrical vehicular power plants to replace internal combustion engines. In PEM-type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive solid polymer electrolyte membrane having the anode catalyst on one of its faces and the cathode catalyst on the opposite face. The MEA is sandwiched between a pair of electrically conductive elements, sometimes referred to as the gas diffusion media components, that: (1) serve as current collectors for the anode and cathode; (2) contain appropriate openings therein for distributing the fuel cell's gaseous reactants over the surfaces of the respective anode and cathode catalysts; (3) remove product water vapor or liquid water from electrode to flow field channels; (4) are thermally conductive for heat rejection; and (5) have mechanical strength. The term fuel cell is typically used to refer to either a single cell or a plurality of cells (e.g., a stack) depending on the context. A plurality of individual cells are commonly bundled together to form a fuel cell stack and are commonly arranged in series. Each cell within the stack comprises the MEA described earlier, and each such MEA provides its increment of voltage.

In PEM fuel cells, hydrogen ($H_2$) is the anode reactant (i.e., fuel) and oxygen is the cathode reactant (i.e., oxidant). The oxygen can be either a pure form ($O_2$), or air (a mixture of $O_2$ and $N_2$). The solid polymer electrolytes are typically made from ion exchange resins such as perfluoronated sulfonic acid. The anode/cathode typically comprises finely divided catalytic particles, which are often supported on carbon particles, and mixed with a proton conductive resin. The catalytic particles are typically costly precious metal particles. These membrane electrode assemblies are relatively expensive to manufacture and require certain conditions, including proper water management and humidification, and control of catalyst fouling constituents such as carbon monoxide (CO), for effective operation.

Examples of technology related to PEM and other related types of fuel cell systems can be found with reference to commonly-assigned U.S. Pat. No. 3,985,578 to Witherspoon et al.; U.S. Pat. No. 5,272,017 to Swathirajan et al.; U.S. Pat. No. 5,624,769 to Li et al.; U.S. Pat. No. 5,776,624 to Neutzler; U.S. Pat. No. 6,103,409 to DiPierno Bosco et al.; U.S. Pat. No. 6,277,513 to Swathirajan et al.; U.S. Pat. No. 6,350,539 to Woods, III et al.; U.S. Pat. No. 6,372,376 to Fronk et al.; U.S. Pat. No. 6,376,111 to Mathias et al.; U.S. Pat. No. 6,521,381 to Vyas et al.; U.S. Pat No. 6,524,736 to Sompalli et al.; U.S. Pat. No. 6,528,191 to Senner; U.S. Pat. No. 6,566,004 to Fly et al.; U.S. Pat. No. 6,630,260 to Forte et al.; U.S. Pat. No. 6,663,994 to Fly et al.; U.S. Pat. No. 6,740,433 to Senner; U.S. Pat. No. 6,777,120 to Nelson et al.; U.S. Pat. No. 6,793,544 to Brady et al.; U.S. Pat. No. 6,794,068 to Rapaport et al.; U.S. Pat. No. 6,811,918 to Blunk et al.; U.S. Pat. No. 6,824,909 to Mathias et al.; U.S. Patent Application Publication Nos. 2004/0229087 to Senner et al.; 2005/0026012 to O'Hara; 2005/0026018 to O'Hara et al.; and 2005/0026523 to O'Hara et al., the entire specifications of all of which are expressly incorporated herein by reference.

In a conventional PEM fuel cell stack, water is produced in the cell reaction. This water must be removed from the stack, along with the spent reactant gas, and typically flows through the same reactant flow channels and manifolds. As the water collects in liquid form in droplets, slugs, and films toward the exit of the stack, it tends to hinder the flow of the reactant gases, thus resulting in instability in stack operation and performance degradation. One proposed method for overcoming the accumulation of water in flow field channels is hydrophilic coating of the bipolar plates. With use of such a highly wettable material, including silicon oxide, titanium oxide, or other similar metal oxides, water passing from the gas diffusion medium into the flow field will favor formation of thin liquid films that do not significantly impede reactant gas flow. This approach has been shown to significantly improve operational stability of the fuel cell stack, especially under low power conditions where uniform distribution of the reactants among individual cells is otherwise difficult to achieve.

Even with the improvement in water and gas transport within the flow field channels provided by hydrophilic coating, water management issues become a concern near the ends of the channels, where the various phases must transition into a region where the flow velocities and forces acting on the flow are quite different. More specifically, a water film tends to form on the face of the outlet manifold wall which tends to cover over the end openings of the reactant channels, thus obstructing the gas flow. This film is acted upon by the force of the moving gas streams, capillary forces, and gravity. However, under some low power operating conditions, the force of the moving gas stream may be insufficient to overcome the liquid film and that gas passage will be blocked.

Accordingly, there exists a need for new and improved fuel cell systems, especially those that include systems for managing water removal therefrom, especially in the vicinity of the reactant channel outlet ends.

SUMMARY OF THE INVENTION

In accordance with a first embodiment of the present invention, a bipolar plate for use in conjunction with a fuel cell is provided, comprising: (1) an edge portion of the bipolar plate; (2) at least one substantially V-shaped projection extending away from the edge portion, the projection having first and second side surfaces; (3) at least one substantially V-shaped groove portion adjacent to either the first or second side surfaces of the projection; (4) a channel formed in the bipolar plate; and (5) a channel exit opening formed in either the first or second side surfaces of the projection.

In accordance with a first alternative embodiment of the present invention, a bipolar plate for use in conjunction with a fuel cell is provided, comprising: (1) a first bipolar plate portion; (2) a second bipolar plate portion adjacent to the first bipolar plate portion; (3) a channel formed between the first and second bipolar plate portions; and (4) a channel exit opening formed in either the first or second bipolar plate portions, wherein a first edge portion of the first or second bipolar plate portions is offset with respect to a second edge portion of the first or second plate portions so as to expose at least a portion of the channel.

In accordance with a second alternative embodiment of the present invention, a bipolar plate for use in conjunction with a fuel cell is provided, comprising: (1) a first bipolar plate portion having a first slanted tip portion, wherein the first slanted tip portion lies in the plane of the first bipolar plate portion; (2) a second bipolar plate portion having a second slanted tip portion adjacent to the first bipolar plate portion, wherein the second slanted tip portion lies in the plane of the second bipolar plate portion; (3) a channel formed between the first and second bipolar plate portions; and (4) a channel exit opening formed in the first or second slanted tip portions.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

In accordance with the general teachings of the present invention, liquid water films can be moved away from the openings of the reactant channels by using capillary forces generated by certain geometric features incorporated into the bipolar plate assembly. It should be appreciated that the present invention can be practiced with stamped metallic bipolar plates as well as composite plastic bipolar plates, including those in stacked configurations. The bipolar plates of the present invention are especially useful in conjunction with fuel cells, such as but not limited to PEM fuel cells.

Figure 1:
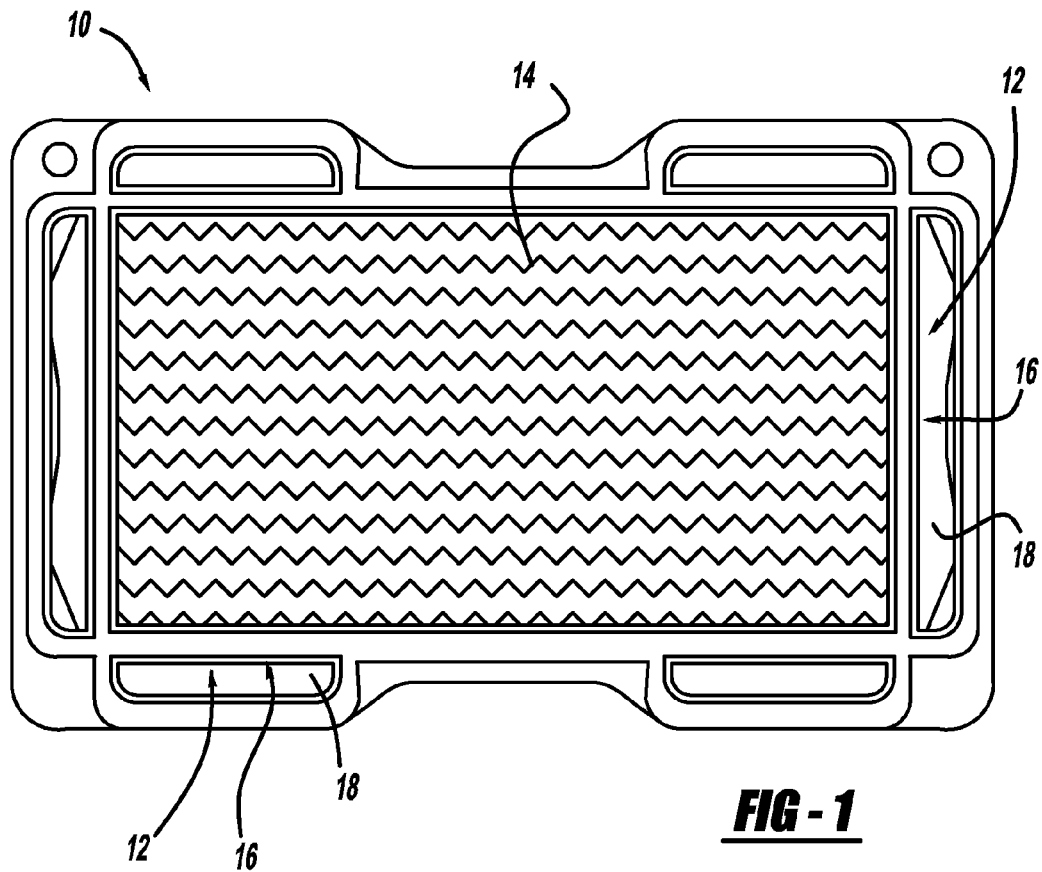
FIG. 1 is a plan view of a bipolar plate, in accordance with the general teachings of the present invention.

Referring to FIG. 1, there is shown a bipolar plate generally at 10, in accordance with the general teachings of the present invention. More specifically, the relative location of the ends 12 of the reactant outlet channels 14 in the end walls 16 of the outlet manifolds 18 of the bipolar plate 10 are shown. It should be appreciated that the present invention can be practiced with any type of fuel cell wherein water management is a concern, especially in the vicinity of the reactant outlet channels or structures/surfaces in proximity thereto.

Figure 2:
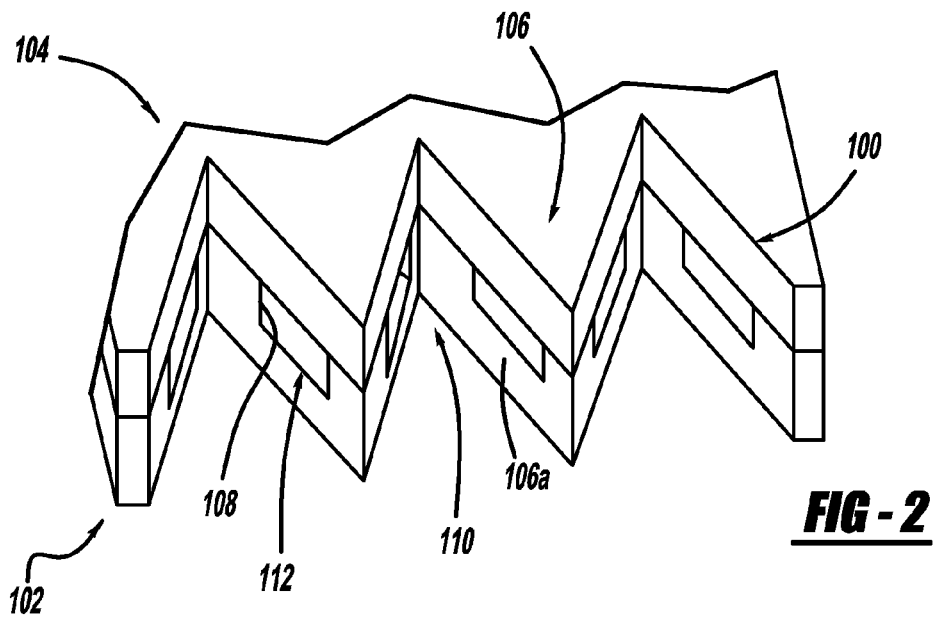
FIG. 2 is a partial perspective view of an edge portion of a bipolar plate, in accordance with a first embodiment of the present invention.

Referring to FIG. 2, in accordance with one aspect of the present invention, angled facets 100 have been provided into the plate edge 102 of the bipolar plate 104 forming the end wall of the outlet manifold. These facets 100 are oriented to form tooth-like or V-shaped projections 106 on the plate edge 102. It should be noted that for orientation purposes only, in this particular view, the flow through the bipolar plate (i.e., the channels thereof) would be downward and out of the page.

Without being bound to a particular theory of the operation of the present invention, it is believed that liquid water leaving the reactant channels 108 is drawn back, e.g., by capillary forces, into the V-shaped grooves 110 of the teeth 106 between the channel exit openings 112, leaving no, or substantially no, liquid film (e.g., water) to cover and obstruct the channel exit openings 112. This allows the reactant gas to relatively easily exit each reactant channel 108 unhindered or at least substantially unhindered. In this view, there may be one or more channel exit openings 112 associated with each of the teeth 106, i.e., one or both side surfaces of the teeth 106 can be provided with a channel exit opening 112. In this embodiment, the channel exit openings 112 are positioned midway along the length of the side surface 106a of the teeth 106. In this view, the channel exit openings 112 of the reactant channels 108 intersect the facets 100 of the teeth 106 and are in fluid communication therebetween. It should also be appreciated that the channel exit openings 112 can be configured such that they are not in fluid communication with adjacent channel exit openings 112, as well.

The V-shaped grooves 110 in adjoining plates can be aligned to amplify this action over the entire manifold face and help lead the water to run away along the bipolar plate to bipolar plate joints to the edges of the manifold and out of the fuel cell stack. That is, as successive bipolar plates are added to the stack assembly, the V-shaped grooves 110 can be aligned with one another.

Figure 3:
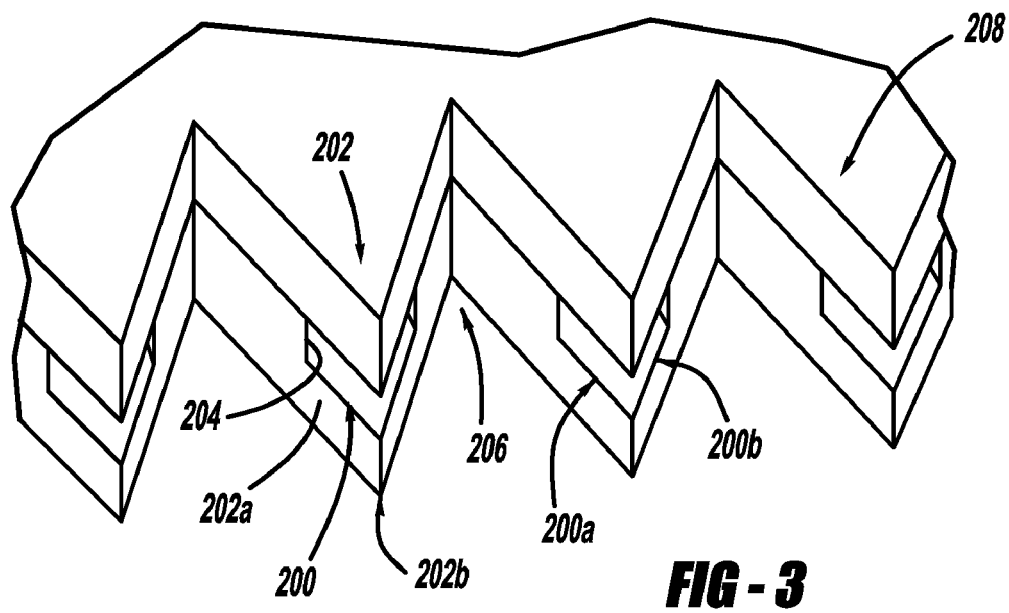
FIG. 3 is a partial perspective view of a first alternative edge portion of a bipolar plate, in accordance with a first alternative embodiment of the present invention.

Referring to FIG. 3, in accordance with another aspect of the present invention, channel exit openings 200 can be located at the extreme tips of the teeth 202, as opposed to midway point of side surface thereof. In this view, the channel exits openings 200 do extend along a side surface portion 202a of the teeth 200; however, the openings extend all the way to the tip portion 202b of the teeth, thus forming a unitary opening. In this manner, one side 200a of the channel exit opening is in fluid communication with the other side 200b of the channel exit opening 200. It should be noted that for orientation purposes only, in this particular view, the flow through the bipolar plate (i.e., the channels thereof) would be downward and out of the page.

Again, as with the embodiment depicted in FIG. 2, it is believed that the embodiment depicted in FIG. 3 allows liquid water leaving the reactant channels 204 to be drawn back into the V-shaped grooves 206 of the teeth 208 between the channel exit openings 200, leaving no, or substantially no, liquid film (e.g., water) to cover and obstruct the channel exit openings 200. This allows the reactant gas to relatively easily exit each reactant channel 204 unhindered or at least substantially unhindered.

Figure 4:
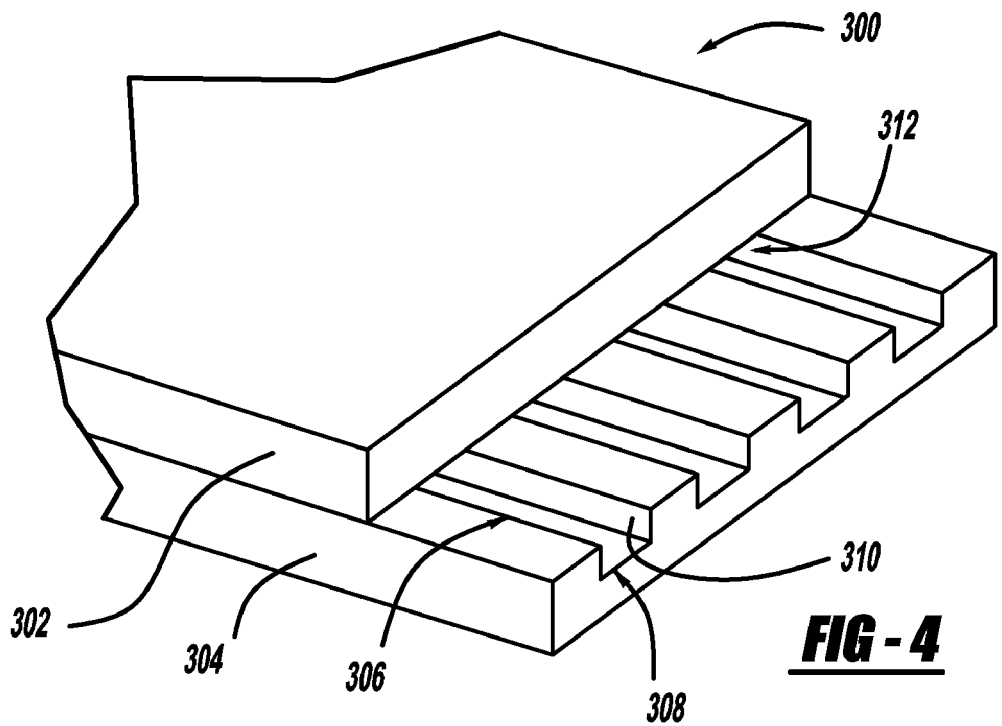
FIG. 4 is a partial perspective view of a second alternative edge portion of a bipolar plate, in accordance with a second alternative embodiment of the present invention.

Referring to FIG. 4, in accordance with still another aspect of the present invention, there is shown a bipolar plate 300 wherein one portion 302 (e.g., an upper portion) of the bipolar plate 300 is offset from another portion 304 (e.g., a lower portion) of the bipolar plate 300 so as to expose the reactant channels 306. As can be seen, this particular embodiment differs from those depicted in FIGS. 2 and 3 as lacking the "sawtooth" arrangement. It should be noted that for orientation purposes only, in this particular view, the flow through the bipolar plate (i.e., the channels thereof) would be from left to right and out of the page. Without being bound to a particular theory of the operation of the present invention, it is believed that the liquid water is drawn toward the end portions 308 of the three-sided sections 310 of the reactant channels 306 by capillary forces, while the gas flows are free to exit near the beginning of the offset portion 312.

Figure 5:
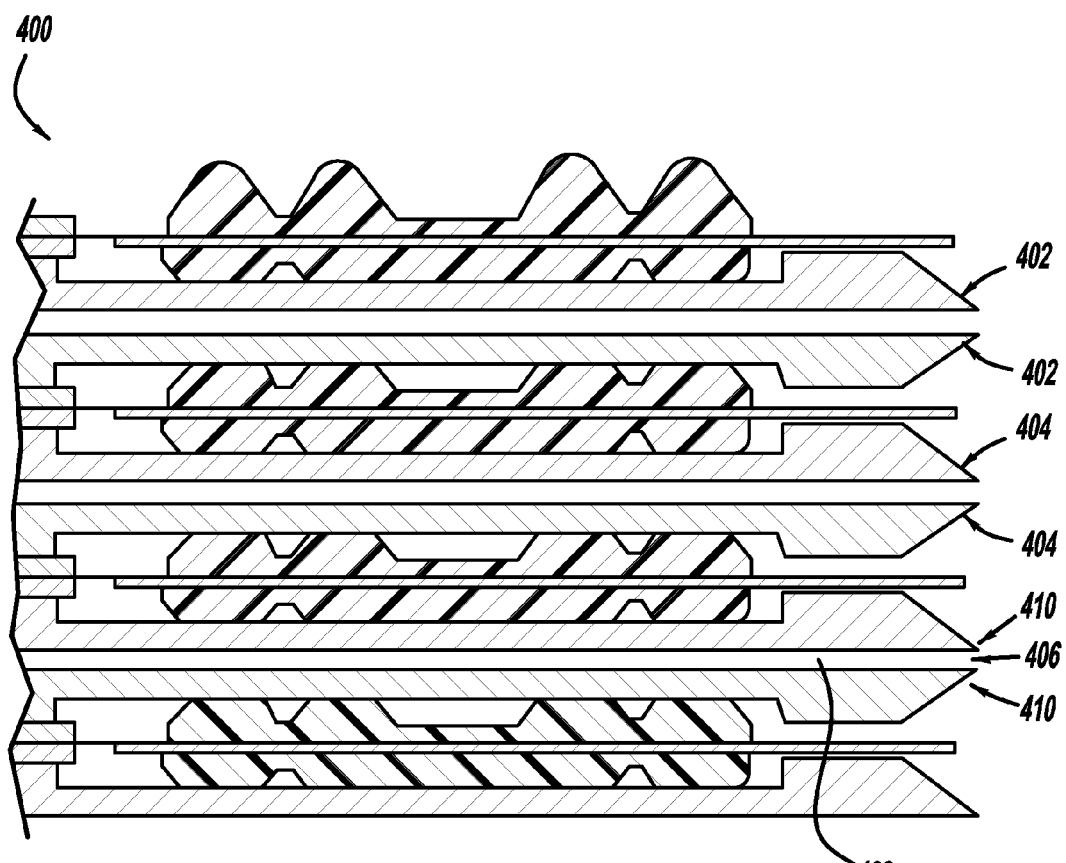
FIG. 5 is a partial sectional view of a fuel cell stack, in accordance with a third alternative embodiment of the present invention.

Referring to FIG. 5, in accordance with still yet another aspect of the present invention, there is shown a fuel cell stack 400 wherein the angled facets 402 are rotated 90° to lie in the plane of the individual bipolar plate edges 404 themselves. It should be noted that for orientation purposes only, in this particular view, the flow through the bipolar plates (i.e., the channels thereof) would be from left to right.

More specifically, the bipolar plate edges 404 are chamfered such that the channel exit openings 406 of the reactant channels 408 are at the tip portions 410 of the reactant channels 408, thus allowing the liquid water to flow away from the channel exit openings 406 and the gas to exit freely. It should be noted the channel exit openings 406 can also be located in a central portion of the facet 402 provided that the water is able to be drawn away toward the plate-to-plate joints where it flows away toward the stack exit.

It should also be noted that hydrophilic coatings, such as but not limited to silicon dioxide, can be selectively applied to any of the aforementioned geometries to enhance the geometric effect on capillary forces. Also, it should be noted that the effect of gravity will interact differently as the stack plates are oriented horizontally or vertically, and the effect on water flow may favor one embodiment over another.

One of the intended benefits of the present invention thus includes, without limitation, the removal of the liquid water from areas of the reactant channel exits and manifold walls that hinder gas flows and lead to instability in stack operation at low loads. It follows that this enhancement will also benefit freeze durability, reduce mal-distribution between cells, and improve fuel cell stack performance.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A bipolar plate for use in conjunction with a fuel cell, comprising:
   an edge portion of the bipolar plate;
   at least one substantially V-shaped projection extending away from the edge portion, the projection having first and second side surfaces;
   at least one substantially V-shaped groove portion adjacent to either the first or second side surfaces of the projection;
   a channel formed in the bipolar plate; and
   a channel exit opening formed in either the first or second side surfaces of the projection.

2. The invention according to claim 1, wherein the fuel cell is a proton exchange membrane fuel cell.

3. The invention according to claim 1, wherein the channel is operable to transport liquid and gaseous materials.

4. The invention according to claim 1, wherein a liquid exiting the channel exit opening is drawn towards the groove.

5. The invention according to claim 1, wherein a liquid exiting the channel exit opening is drawn towards the groove by capillary forces.

6. The invention according to claim 1, further comprising a plurality of projections.

7. The invention according to claim 6, wherein the plurality of projections are substantially aligned with respect to one another.

8. The invention according to claim 1, further comprising a plurality of grooves.

9. The invention according to claim 1, wherein the channel exit opening extends along a tip portion of the projection.

10. The invention according to claim 1, wherein the channel exit opening extends along a midpoint portion of the length of the first or second side surfaces of the projection.

11. The invention according to claim 1, wherein the bipolar plate is comprised of materials selected from the group consisting of metals, plastics, and combinations thereof.

12. The invention according to claim 1, further comprising a hydrophilic coating applied to a surface of the bipolar plate.

* * * * *